(12) United States Patent
Johnson et al.

(10) Patent No.: US 7,211,296 B2
(45) Date of Patent: May 1, 2007

(54) CHALCOGENIDE GLASS NANOSTRUCTURES

(75) Inventors: Bradley R. Johnson, Richland, WA (US); Michael J. Schweiger, Richland, WA (US); Brett D. MacIsaac, Kennewick, WA (US); S. Kamakshi Sundaram, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 139 days.

(21) Appl. No.: 10/646,264

(22) Filed: Aug. 22, 2003

(65) Prior Publication Data

US 2005/0063652 A1  Mar. 24, 2005

(51) Int. Cl.
*C23C 16/00* (2006.01)

(52) U.S. Cl. .............................. 427/255.31; 427/2.24; 427/255.29; 977/734

(58) Field of Classification Search ........... 427/255.29, 427/255.31, 2.24
See application file for complete search history.

(56) References Cited

U.S. PATENT DOCUMENTS

| | | | |
|---|---|---|---|
| 3,883,214 A | 5/1975 | Hoffman | |
| 4,095,011 A | 6/1978 | Hawrylo et al. | |
| 4,126,732 A | 11/1978 | Schoolar et al. | |
| 4,127,414 A | 11/1978 | Yoshikawa et al. | |
| 4,234,625 A | 11/1980 | Petrov et al. | |
| 4,279,464 A | 7/1981 | Colombini | |
| 4,296,191 A | 10/1981 | Jacobson et al. | |
| 4,368,099 A | 1/1983 | Huggett et al. | |
| 4,405,879 A | 9/1983 | Ataka et al. | |
| 4,533,593 A | 8/1985 | Miyata et al. | |
| 4,840,922 A | 6/1989 | Kobayashi et al. | |
| 4,849,070 A | 7/1989 | Bly et al. | |
| 4,927,771 A | 5/1990 | Ferrett | |
| 5,015,052 A | 5/1991 | Ridgway et al. | |
| 5,298,295 A * | 3/1994 | Winter et al. | 427/585 |
| 5,310,669 A * | 5/1994 | Richmond et al. | 435/177 |
| 5,581,091 A | 12/1996 | Moskovits et al. | |
| 5,591,312 A | 1/1997 | Smalley | |
| 5,726,524 A | 3/1998 | Debe | |
| 5,783,498 A | 7/1998 | Dotta | |
| 5,866,204 A | 2/1999 | Robbie et al. | |
| 5,916,642 A | 6/1999 | Chang | |
| 6,033,766 A | 3/2000 | Block et al. | |
| 6,087,197 A | 7/2000 | Eriguchi et al. | |
| 6,103,540 A | 8/2000 | Russell et al. | |
| 6,159,831 A * | 12/2000 | Thrush et al. | 438/582 |
| 6,248,674 B1 | 6/2001 | Kamins et al. | |

(Continued)

OTHER PUBLICATIONS

Rao et al. "Inorganic Nanotubes", Solid State and Structural Chemisty Unit, Indian Institute of Science, Dec. 2002.*

(Continued)

*Primary Examiner*—Timothy Meeks
*Assistant Examiner*—David Turocy
(74) *Attorney, Agent, or Firm*—Klarquist Sparkman, LLP

(57) ABSTRACT

Chalcogenide nanowires and other micro-and nano scale structures are grown on a preselected portion of on a substrate. They are amorphous and of uniform composition and can be grown by a sublimation-condensation process onto the surface of an amorphous substrate. Among other uses, these structures can be used as coatings on optical fibers, as coatings on implants, as wispering galleries, in electrochemical devices, and in nanolasers.

3 Claims, 9 Drawing Sheets

U.S. PATENT DOCUMENTS

| | | | |
|---|---|---|---|
| 6,313,015 B1 | 11/2001 | Lee et al. | |
| 6,432,740 B1 | 8/2002 | Chen | |
| 6,444,256 B1 | 9/2002 | Musket et al. | |
| 6,458,621 B1 | 10/2002 | Beck | |
| 6,459,095 B1 | 10/2002 | Heath et al. | |
| 6,465,132 B1 | 10/2002 | Jin | |
| 6,586,095 B2 | 7/2003 | Wang et al. | |
| 2004/0206448 A1* | 10/2004 | Dubrow | 156/276 |

OTHER PUBLICATIONS

Seifert et al. Stability of Metal Chalcogenidt Nanotubes, Journal of physical chemistry B. 2002, vol. 106, pp. 2497-2501.*

D'yakonenko et al. "Nanostructure of the amorphous films of glass forming chalcogenide compounds".*

"Chalcogen". Wikipedia Encyclopedia.*

Baidakova et al., "Nano-scale medium-range order in semiconducting glassy chalcogenides," *Journal on Non-Crystalline Solids*, 192 & 193, pp. 149-152 (1995).

Brust et al., "Langmuir-Blodgett Films of Alkane Chalcogenide (S,Se,Te) Stabilized Gold Nanoparticles," *Nano Letters*, vol. 1, No. 4, pp. 189-191 (2001).

Chae et al., "Optical and magnetic properties induced by structural confinement of ternary chalcogenide in AlMCM-41 nanotube," *Chemical Physics Letters*, vol. 341, pp. 279-284 (2001).

D'yakonenko et al., "Nanostructure of the Amorphous Films of Glass Forming Halcogenide Compounds,"No. 3, pp. 57-60 (2003).

Hu et al., "Chemistry and Physics in One Demension: Synthesis and Properties of Nanowires and Naotubes,"*Acc. Chem. Res.*, vol. 32, No. 5, pp. 435-445 (1999).

Kikineshi et al., "Nanolayered Chalcogenide Glass Structures for Optical Recording," *Pergamon, Nanostructured Materials*, vol. 12. pp. 417-420 (1999).

Kolobov et al., "A nonometer scale mechanism for the reversible photostructural change in amorphous chalcogenides," *Journal of Non-Crystalline Solids*, 232-234, pp. 80-85 (1998).

Li et al., "Sonochemical synthesis of nanocrystalline lead chalcogenides: PbE (E = S, Se, Te)," *Materials Research Bulletin*, vol. 38, pp. 539-543 (2003).

Li et al., Room-temperature conversion route to nanocrystalline mercury chalcogenides HgE (E = S,Se,Te), *Journal of Physics and Chemistry of Solids*, vol. 60, pp. 965-698 (1999).

Lieber, "Nanowire Superlattices," *Nano Letters*, vol. 2. No. 2, pp. 81-82 (2002).

Liu et al., "growth of amorphous silicon nanowires," *Chemical Physics Letters*, 341, pp. 523-528 (2001).

Malik et al., "Air-Stable Single-Source Precursors for the Synthesis of Chalcogenide Semiconductor Nanoparticles," *Chem. MAter.*, vol. 13, No. 3, pp. 913-920 (2001).

Malik et al., "A Simple Route to the Synthesis of Core/Shell Nanoparticles of Chalcogenides," *Chem. Mater.*, vol. 14, No. 5, pp. 2004-2010 (2002).

Morales et al., "A Laser Ablation Method for the Synthesis of Crystalline Semiconductor Nanowires," *Science*, vol. 279, pp. 208-211 (Jan 9, 1998).

Nesheva et al., "Nanoparticle layers of CdSe buried in oxide and chalcogenide thin film matrices," *Vacuum*, vol. 65, pp. 109-113 (2002).

Peng et al., "Electrochemical fabrication of ordered $Bi_2S_3$ nanowire arrays," *J. Phys. D; Appl. Phys.*., vol. 34, pp. 3224-3228 (2001).

Peng et al., "Synthesis of highly ordered CdSe nanowire arrays embedded in anodic alumuna membrane by electrodeposition in ammonia alkaline solution," *Chemical Physics Letters* vol. 343, pp. 470-474 (2001).

Qian et al., "Solvent-thermal preparation of nanocrystalline tin chalcogenide," *Journal of Physics and Chemisrty of Solids*, vol. 60, pp. 415-417 (1999).

Rajamathi et al., "Oxide and chalcogenide nanoparticles from hydrothermal/solvothermal reactions," *Current Opinion in Solid State and Materials Science*, vol. 6, pp. 337-345 (2002).

Rao et al., "Inorganic nanotubes," *Dalton Tran.*, pp. 1-24 (2003).

Routkevitch et al., "Electrochemical Fabrication of CdS Nanowire in Porous Anodic Aluminum Oxide Templates," *J. Phys. Chem.*, vol. 100, No. 33, pp. 14037-14047 (1996).

Seifert et al., "Stability of Metal Chalcogenide Nanotubes," *J. Phys. Chem. B*, vol. 106, No. 10, pp. 2497-2501 (2002).

Wang et al., "Si nanowires grown from silicon oxide, " *Chemical Physics Letters*, vol. 299, pp. 237-242 (1999).

Wang et al., "Transmission electron microscopy evidence of the defect structure in Si nanowires synthesized by laser ablation," *Chemical Physics Letters*, vol. 283, pp. 368-372 (1998).

Yan et al., "Growth of amorphous silicon nanowires via a solid-liquid-solid mechanism," *Chemical Physics Letters*, vol. 323, pp. 224-228 (2000).

Yang et al., "Nanostructured high-temperature superconductors: Creation of strong-pinning columnar defects in nanorod/superconductor composites," *J. Mater. Res.*, vol. 12, No. 11, pp. 2981-2996 (Nov. 1997).

Zhang et a;., "Synthesis of nanocrystalline lead chalcogenides PbE (E = S, Se, or Te) from alkaline aqueous solutions," *Materials Research Bulletin*, vol. 35, pp. 209-215 (2000).

Zhang et al., "Morphology and growth mechanism study of self-assembled silicon sanowires synthesized by thermal evaporation," *Chemical Physics Letters*, vol. 337, pp. 18-24 (2001).

* cited by examiner

CHALCOGENIDE GLASS NANOSTRUCTURES

This invention was made with Government support under Contract Number DE-AC0676RLO1830 awarded by the U.S. Department of Energy. The Government has certain rights in the invention.

TECHNICAL FIELD

The present invention is generally related to nanostructures and, more particularly but not exclusively, is related to amorphous chalcogenide nanostructures and the fabrication and use thereof.

BACKGROUND

The chalcogen elements (S, Se, and Te) are glass-formers. These elemental glasses are essentially chains that polymerize to varying lengths. Chalcogenide glasses are formed by combining chalcogen elements with Group III, IV or V elements, which are more electropositive than the chalcogens and lead to crosslinking. While some studies reveal large-scale medium-range ordering with correlation lengths up to about 50 Å, chalcogenide glasses are considered amorphous materials. Many chalcogenide glasses, for example arsenic based chalcogenide glasses such as As—S, As—Se, As—S—Se, As—Te, As—Se—Te, are semiconducting materials that transmit infrared (IR) light, rendering them useful in a variety of applications, such as IR sensors, waveguides, photonic crystals, amplifiers, lenses and as photolithography template materials. Rare earth doped chalcogenide glasses are also being investigated for highly efficient optical amplifiers and lasers.

Certain chalcogenides also have therapeutic properties and are being considered for a variety of treatments. For example, selenium, an essential trace mineral for normal metabolism, plays a protective role against cancer and can be used as an indicator of body status in cancer patients, for example in the form of a selenide, selenite ($SeO_3^{2-}$) or selenate ($SeO_4^{2-}$). In addition, at low concentrations, arsenic trioxide is an effective antileukaemic agent and shows promise for use against tumors that have become resistant to other anticancer drugs.

Despite the interest in chalcogenides, the ability to fabricate them on the micro and nanoscale has been limited. Accordingly, there is a need for novel systems and techniques for the nanofabrication of chalcogenides. The present invention addresses this need.

SUMMARY

The present invention provides systems and techniques for producing chalcogenide nanostructures and provides ways to use said structures. While the actual nature of the invention covered herein can only be determined with reference to the claims appended hereto, certain aspects of the invention that are characteristic of the embodiments disclosed herein are described briefly as follows.

According to one aspect, the present invention provides substantially amorphous chalcogenide nanowires grown on a substrate. In one form, the substrate itself is also amorphous. In certain forms, the chalcogenide nanowires are infrared transparent and may be used in a variety of infrared applications. In one particular form, the nanowires are arsenic sulfide based.

According to another aspect, a method for producing nanowires includes depositing a vapor onto a preselected portion of a substrate such that nanowires of the vapor are grown on the substrate. In one form, the vapor is a chalcogenide vapor produced by sublimation.

According to further aspects, specific applications of chalcogenide nanostructures are provided including a novel coating on optical fibers for evanescent wave sensors, a novel coating on medical implants, and novel electrodes for electrochemical cells.

These and other aspects are discussed below.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part thereof.

FIG. 2A is a top view and FIG. 2B is a cross section.

DESCRIPTION OF THE ILLUSTRATED EMBODIMENTS

Figure 1:
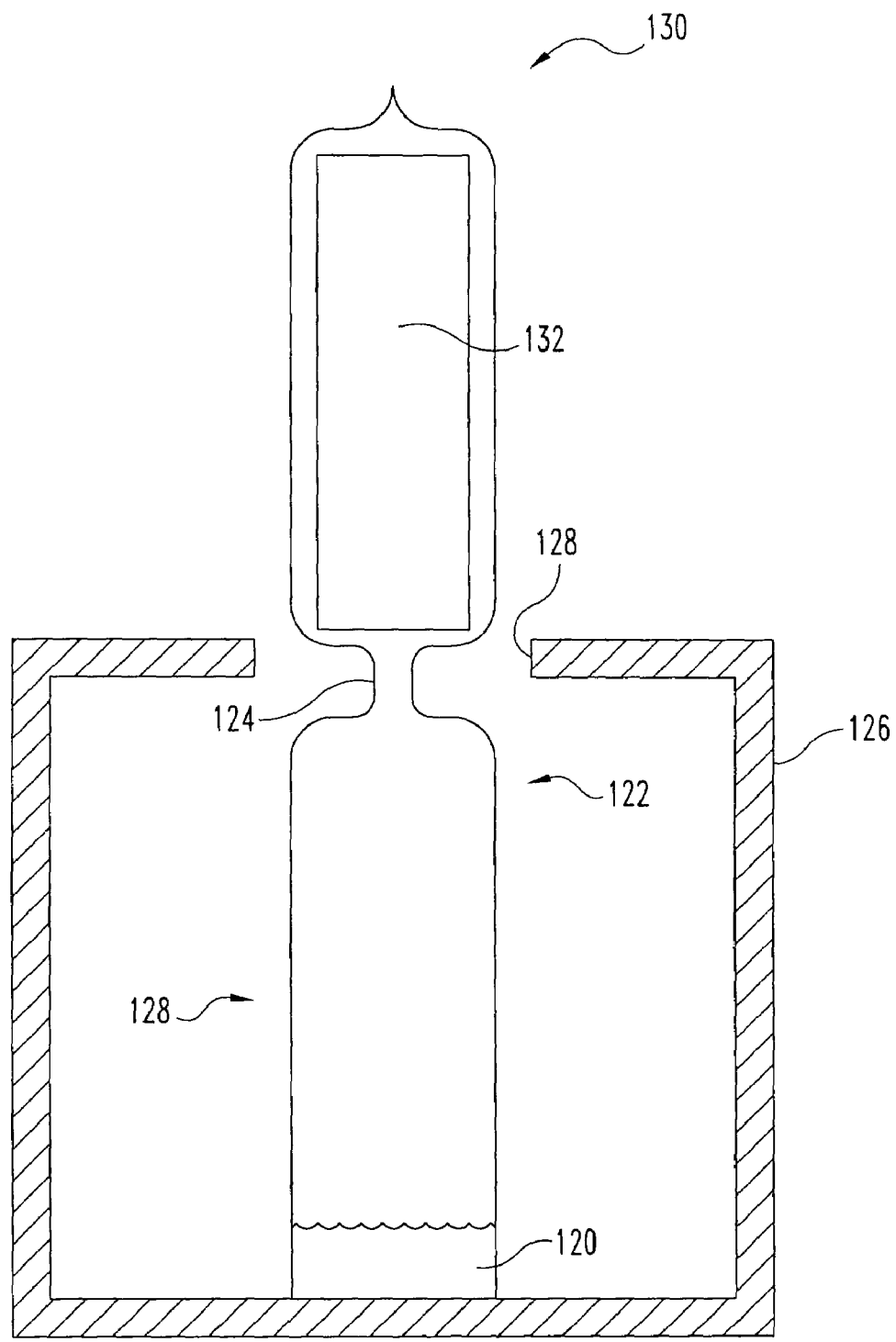
FIG. 1 is a schematic illustration of a system for forming nanostructures according to the Examples.

For the purposes of promoting an understanding of the principles of the invention, reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

In one form, the present invention provides novel nanowires composed of a chalcogenide glass material. These nanowires have been grown by a sublimation-condensation process and have been demonstrated to be amorphous. Surprisingly, it has been found that these nanowires can be grown on an amorphous substrate.

As used herein, amorphous refers to an uncrystallized material lacking substantial long range order.

Glass refers to an inorganic amorphous material formed by cooling to a rigid condition without crystallization.

Sublimation means the vaporization of a substance from the solid into the vapor state without formation of an intermediate liquid phase. Sublimation occurs at reduced pressures and temperatures below the lowest melting temperature of the solid. When the solid material is a glass whose transition from solid to melt is characterized by a melting range, rather than a melting point, sublimation is the vaporization without formation of an intermediate melt phase. The sublimation of a glass occurs at reduced pressures and at temperatures at least below the high end of the melting range. For example, sublimation of a glass will typically occur within about 100° C. of the glass transition temperature.

Nanoscale objects are those that have at least one dimension less than about 100 nm, and microscale objects are those that have at least one dimension less than about 100 µm.

A nanowire refers to a nanostructure that is a fiber or other high aspect ratio structure. The aspect ratio of a nanowire is typically much greater than 1, for example between 10 and 1,000,000.

A micro-island is a localized deposit or droplet on a substrate having a diameter between 100 nm and 100 µm.

A micro-crystal is a crystal with physical dimensions less than 100 µm.

Figure 9:
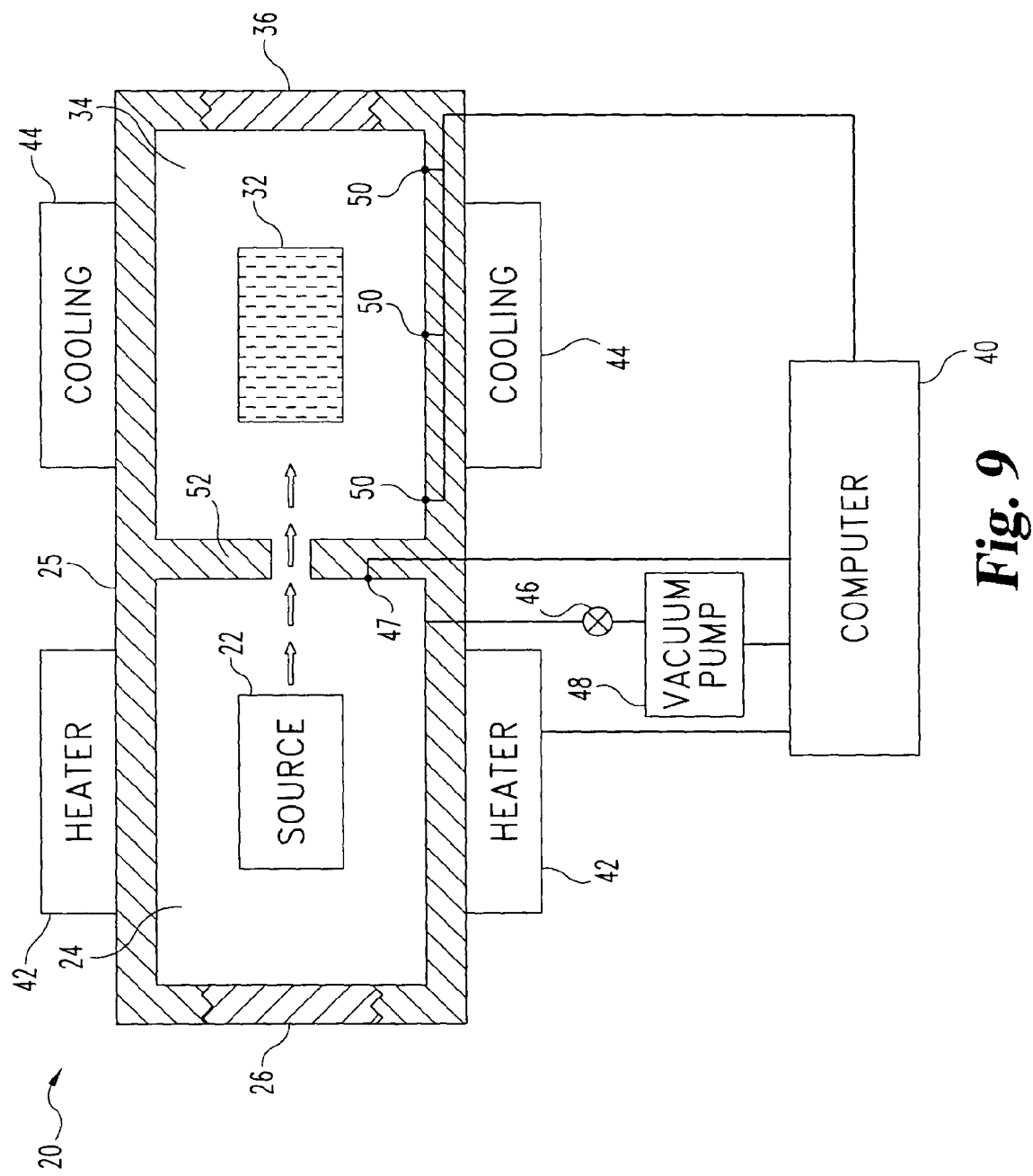
FIG. 9 is a schematic illustration of a system for forming nanostructures on a substrate.

Turning first to FIG. 9, a system 20 for fabricating microstructures on a substrate 32 is schematically depicted. A bulk solid source 22 of a material is placed in one portion 24 of a vessel 25, and a second portion 34 of the vessel 25 receives the substrate 32. End caps 26 and 36 are threaded into the ends to seal vessel 25, and a vacuum pump 48 evacuates the vessel 25, for example until the pressure in the vessel is less than about 100 mTorr as determined by pressure monitor 47. When the desired pressure is achieved, valve 46 is closed and the vacuum pump 48 is turned off.

Heaters 42 are then activated to raise the temperature of source 22 to vaporize the bulk material and produce a vapor in portion 24. As the vapor is created in portion 24, coolers 44 are activated to cool portion 34 of vessel to establish a predetermined temperature (or temperature profile) on substrate 34 for condensation of the vapor. System 20 includes temperature sensors 50 in portion 34 for monitoring the temperature of the substrate 32, and computer 40 is programmed to make appropriate adjustments to maintain the desired temperature at substrate 32. Thermally insulating projections 52 serve to help maintain the desired temperature gradient in vessel 25 while permitting the free transport of the chalcogenide vapor between portion 24 to portion 34.

The heating and cooling are controlled to generate vapor from the solid source 22 and to condense or otherwise physically deposit it on the substrate 32. The heating and cooling can be provided by any conventional means, such as via a furnace and fan respectively. In one aspect, the heating of the bulk source material 22 is controlled to provide for the non-dissociative vaporization of the bulk material into vapor phase. In this way, the vapor phase is not activated (i.e. is not reactive) and the stoichiometric composition of the vapor substantially matches that of the source material 22. In one form, the vaporization conditions (temperature, pressure) may be selected to provide for sublimation of the bulk material into a vapor phase. In other forms, the vaporization includes an intermediate liquid or melt phase. In still other variations, a higher energy vaporization procedure, such as laser ablation, ion sputtering, or e-beam activation, might be employed to provide a vapor phase that is not reactive such that it will physically condense into the desired nano or microscale structures.

While a variety of bulk starting materials may be employed, in one aspect, the bulk source material is a chalcogenide or similar material, and is either crystalline or amorphous. In a further aspect, the bulk source material 22 is a chalcogenide glass. Chalcogenide glasses useful as starting material 22 include As—S, As—Se, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—Se—Tl, As—Te—Tl, As—Se—Ga, and Ge—Sb—Se. Arsenic (As) is preferably present in at least about 5 mole % and may be present in an amount up to about 43 mole %. In one form the molar ratio of arsenic to chalcogen is between about 1:19 and about 3:4, for example about 2:3. In addition, these chalcogenide glasses may be doped with combinations of one or more of the rare earth elements, gallium (Ga), germanium (Ge), tin (Sn), antimony (Sb), silver (Ag), copper (Cu), cadmium (Cd), zinc (Zn), and lead (Pb). The doping can be in any useful amount, for example up to about 10 mole %. In typical applications, the dopant will be 5 mole % or less of the chalcogenide glass. In other forms, the bulk source material 22 is in crystalline form.

It has been found that, depending on the temperature of the substrate 32, a chalcogenide vapor produced in the low pressure environment of vessel 25 will condense on the substrate 32 in the form of amorphous nanowires or other useful nano-scale and micro-scale structures. It has further been found that these structures have uniform composition and can be formed from a single bulk starting material, without intermediate chemical activation or reaction. Because of this, the composition of the structures grown on the substrate substantially matches the composition of the starting material, thereby providing a simple mechanism for forming nanostructures of a desired composition.

As a particular example, in the As—S system described more fully in the Examples below, amorphous As—S nanowires were grown on the portion of the substrate that was about 100–75° C., micro islands were formed on the substrate that was about 175–100° C., and a continuous thin film sill formed on the substrate that was about 250–150° C. The microislands and thin films are believed to also be amorphous, though extensive microcharacterization was not performed. More generally, it is believed that for a given starting material, when the substrate 32 is substantially cooler than the vapor, nanowires will form; for warmer substrates, micro-islands will form; and for still warmer substrates, thin films will be deposited.

Several of the amorphous nanowires constructed according to the present invention will be optically transparent and can be used in combination with micro-scale or macro-scale infrared transmitting structures. For example in one application, amorphous chalcogenide nanowires are grown on an optical fiber, for example on the surface of an infrared transmitting optical fiber.

Optical fibers that can benefit from a chalcogenide nanowire coating include those used in evanescent wave spectroscopy. Evanescent wave spectroscopy is an infrared (IR) spectroscopic sensing technique that exploits optical coupling between thinned fibers (for example where a section of them has been drawn to diameters less than about 200 μm) and the medium they are immersed in (e.g. gas or liquid) or are in contact with (e.g. biological tissue). As is known in the art, when broad-spectrum infra-red light travels down the length of a fiber and it reaches the thinned area of the fiber, the light begins to travel on the surface of the fiber and consequently will interact with the surrounding medium. This results in the selected absorption of certain frequencies of the IR light, if there is sufficient coupling between the light and the various vibrational modes of the molecules that it contacts. A comparison is then made between the spectrum of the light sent into the fiber and the light that comes out at the other end so as to characterize the sample. For example, a Fourier Transform Infrared Spectrometer (FTIR) can provide the IR signal source in combination with a mercury-cadmium-telluride (MCT) detector. Any absorption of the IR light by the contacting medium results in absorption peaks in the spectra, and provides a means to characterize and identify the chemical composition of that medium.

Problem with such traditional techniques involve poor signal to noise ratios due to the relatively small evanescent coupling effect and difficulties in fabricating the optical fibers, which are traditionally short and delicate. An improved fiber is provided according to the present invention by coating an IR transparent chalcogenide or fluoride fiber with a nanowire coating. The nanowire coating can be composed of a chalcogenide or fluoride of similar or different composition than the composition of the optical fiber.

Figure 10:
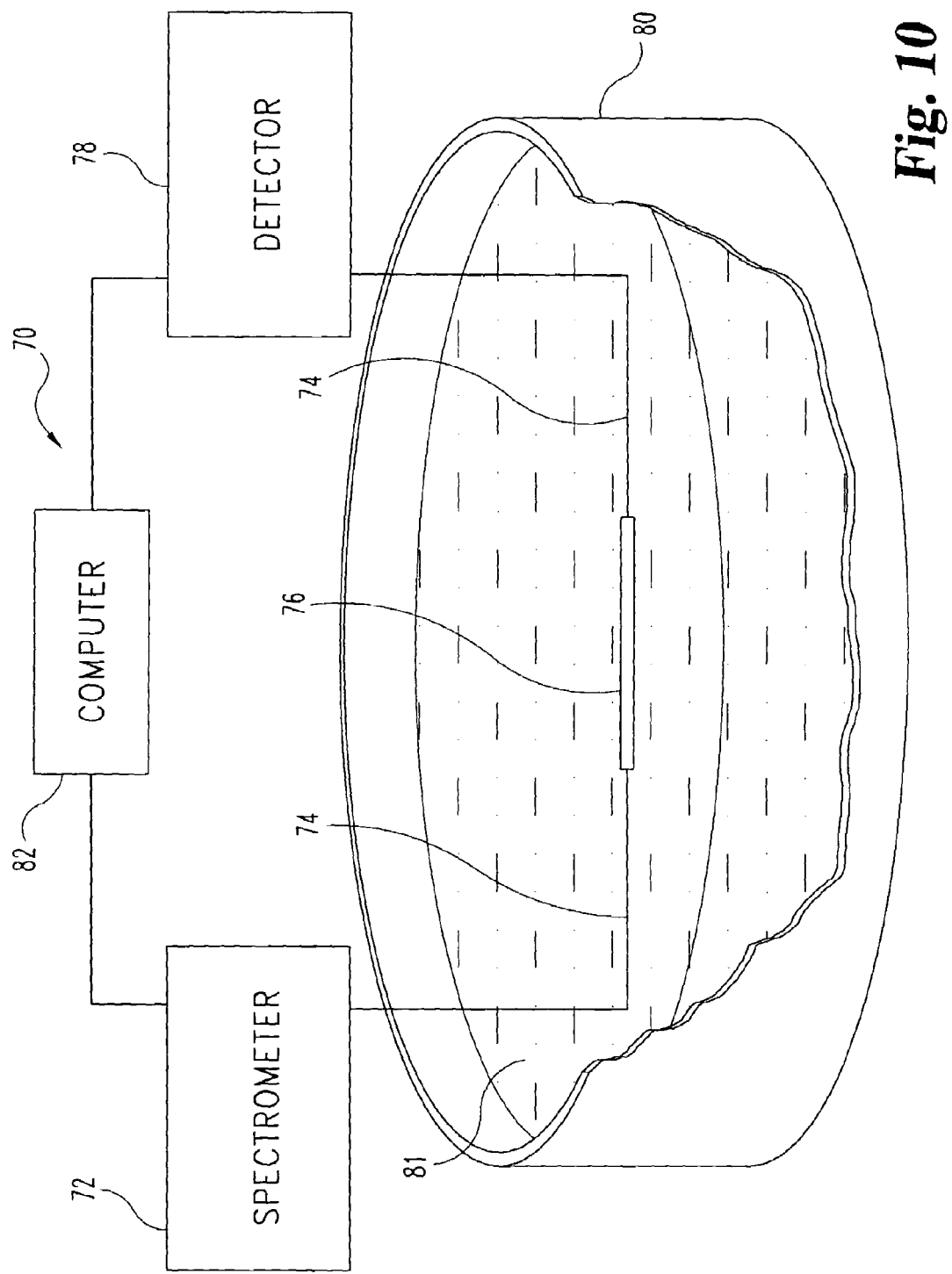
FIG. 10 is a schematic illustration of a system for performing evanescent wave spectroscopy.

A schematic illustrating of a system 70 for performing evanescent wave spectroscopy is depicted in FIG. 10. A spectrometer 72 is optically coupled to transmit light through an IR transparent fiber 74 in contact with a gas or liquid sample 81 contained in sample container 80. At least a portion of the fiber 74 in contact with the sample 81 has a nanowire coating 76. The coating can fully or partially cover the exterior of fiber 74. An optical detector 78 receives light transmitted through the fiber 74. The spectrometer 72 and detector 78 are coupled to a computer which controls activation and collection of the light spectra and analyzes the sample based on the determined spectra. The nanowire coating 76 increases the surface area of interaction between the light transmitted through the fiber 74 and the sample 81, leading to improved signal to noise ratios. In other aspects, the nanowire coating reinforces the fiber 74, for example to thereby reduce the incidence of the fiber 74 breaking.

Figure 11:
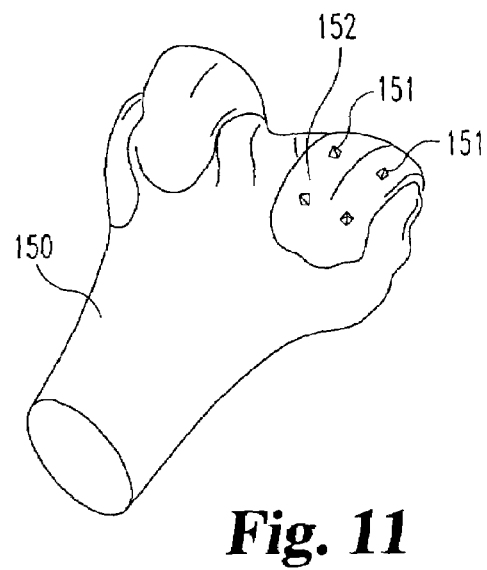
FIG. 11 is a schematic illustration of an implant bearing a coating according to the present invention.

In another aspect, the present invention provides inventive coatings for medical devices. Turning now to FIG. 11, a therapeutic coating 152 is provided on the surface of implant 150. Implant 150 can be a prosthesis, such as an artificial joint such as hip or knee, or implant 150 can be any other biocompatible device adapted to be implanted into the body, such as a bone screw or rod. The function of the coating can be to provide the localized delivery of the coated material. Once implanted in a patient's body, the coating 152 can remain on the implant and interact with adjacent tissue and/or it may slowly release into the body to circulate through the bloodstream. Coating 152 can include thin films, micro-islands, micro-crystals, and/or nanowires, and the release rate of therapeutic chemicals from coating 152 into the patient's body is controlled by controlling the morphology (shape), size, and composition of the coating. As depicted in FIG. 11, coating 152 includes a plurality of micro-crystals 151.

Exemplary therapeutic materials for coating 152 include materials such as Se—O and As—O. These materials can be coated on implant 150 using a sublimation-condensation procedure as described above with respect to the formation of coatings on substrate 32. In other words, implant 150 is substituted for substrate 32 in the system of FIG. 9, and a suitable material is provided as source 22. The sublimation and condensation temperatures are then selected to achieve the desired morphology of the coating 152.

For example, a therapeutic chalcogenide implanted according to the present invention can be used to treat cancer or deliver cancer protecting nutrients locally in the human body. In one aspect, arsenic trioxide crystals formed according to the techniques presented herein are locally implanted in or around cancerous tumors. In another aspect, a selenium containing chalcogenide is coated on an implant. The slow release of selenium from the implant then provides nutrient delivery to the body.

Figure 12:
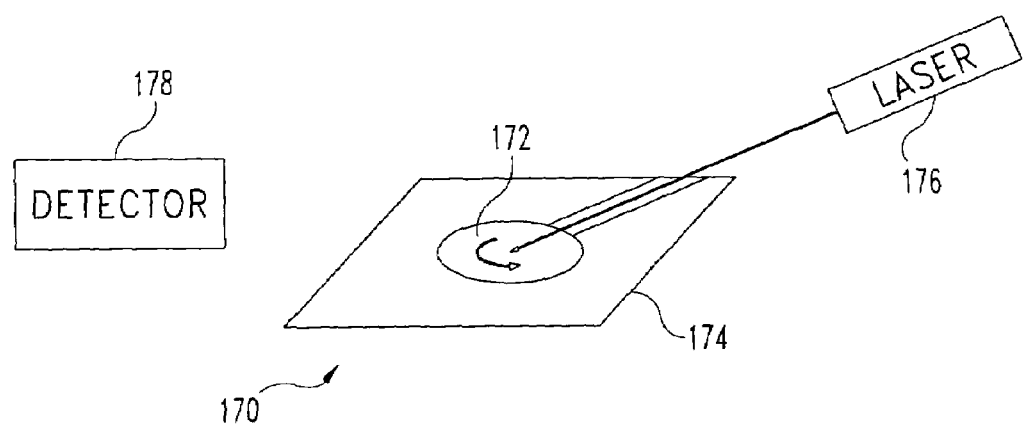
FIG. 12 is a schematic illustration of a wispering gallery system according to still another embodiment of the invention.

Turning now to FIG. 12, a further implementation of the invention involves formation of islands 172 of optically nonlinear material (like a chalcogenide) on a substrate 174. Islands 172 are thin and substantially or perfectly round such that they are capable of capturing light by total internal reflection to thereby interact with light in a wispering gallery mode or to function as a wispering gallery resonator. FIG. 12 schematically depicts one implementation of a wispering gallery system 170 wherein a laser 176 directs light of a preselected wavelength into island 172. A detector 178, such as a CCD camera, detects the resulting wispering gallery resonance modes from island 172.

Wispering gallery mode (WGM) is a resonance of a light wave trapped inside dielectric spheres, discs or rings by total internal reflection. According to the Lorenz-Mie theroy, micro-spheres with the diameters of around 10–100 μm show very narrow resonances, permitting the construction of resonators based on WGM having high Q-values and small mode-volume. Accordingly, a WGM optical cavity (i.e. disc, sphere, or ring) has potential aplications in photon manipulation in quantum mechanical regimes. Wispering galleries have been constructed and or modeled by others utilizing silica glass or polystyrene in the shape of micro-spheres, micro-discs, and micro-rings. The present invention provides a method of making wispering galleries of chalcogenides by depositing a micro-island of chalcogenide onto a substrate. The deposition temperature and pressure are selected to achieve the desired diameter. It is believed that for a given pressure, the temperature of the substrate exposed to the chalcogenide vapor will determine the diameter of the micro-island, with higher substrate temperatures leading to larger diameter micro-islands.

Still other applications of the coating techniques presented herein include use in the formation of electrochemical devices and lasers. Exemplary electrochemical devices include fuel cells, batteries, and hydrogen generators, each of which may be constructed by coating a substrate forming a portion of the electrochemical device with a chalcogenide material.

Reference will now be made to examples illustrating a specific embodiments of the invention. It is to be understood, however, that these examples are provided for illustration and that no limitation to the scope of the invention is intended thereby.

EXAMPLES

Arsenic sulfide nanowires were grown and analyzed as follows.

Starting Materials

Stoichiometric quantities of high purity elemental arsenic and sulfur (Alfa Aesar, Ward Hill, Mass.) were combined in glass tubes (fused quartz or borosilicate) which were then evacuated and sealed with a propane torch to fabricate ampoules. The sealed ampoules were heated to 500° C. and rocked in a rocking furnace (DelTec, Denver, Colo.) for up to 18 h, to ensure uniform mixing of the two components. After rocking, the ampoules were quenched in air down to approximately 200° C. The quenched glass was then annealed by placing them in a furnace pre-heated to 200° C. The ampoules were held at that temperature for at least 2 h and then the furnace was turned off and allowed to slowly cool to ambient temperatures. Bulk arsenic sulfide was also obtained from a commercial source (Alfa Aesar) in the form of broken chunks of of porous glass.

Sublimation-condensation of As—S

Bulk As—S glass was synthesized as described above or commercially obtained. In each case the molar ratio of As to S was approximately 2 to 3. Referring to FIG. 1, small pieces 120 of this glass weighing approximately 1 g were placed in a reaction vessel 122. The reaction vessel was a 16 mm diameter fused quartz tube 30–40 cm long. In some cases, a reduced neck 124 was created along the length of the vessel 122 approximately 17 cm from the bottom by drawing a vacuum and heating with a propane torch along the perimeter until the glass wall was drawn inwards. Reaction vessels with various diameter necks 124 ranging between 3–10 mm were created and used. The reduced necks 124 were created in part to investigate any effect on nanowire formation (no noticeable effect observed) but also to hold a separate substrate 132 in the upper portion 130 of the reaction vessel 122. In other cases, no separate substrate 132 was used and the deposition was solely on the walls of the vessel. For containment in the event of a failure of the reaction vessel, the reaction vessel 122 was placed in a secondary containment vessel (not shown) of a larger diameter (4.5 cm ID) fused quartz tube closed on one end.

After evacuating the reaction vessel to about 100 mTorr and sealing it, the reaction vessel 122 and containment vessel were placed in a box furnace 126 with a hole 128 in the top of the furnace 126 so that the upper 18 cm of the reaction vessel stuck out above the top of the furnace 126. The furnace 26 was heated to 450° C., and the glass in the reaction vessel was held at that temperature for 4 h. This configuration was designed to create a thermal gradient from the hot zone in the lower portion 128 of the reaction vessel 122 (where the chalcogenide glass would vaporize/sublime), up to a cool zone in the upper portion 130 (where the chalcogenide vapors would condense/deposit). The temperature on the outside of the ampoule was measured with an array of thermocouples (not shown) from the neck 124 to the top of the upper portion 130 of the ampoule.

During the course of the experiments, As—S vapor sublimed from the solid pieces 120 and condensed along the upper walls of the reaction vessel (and on the substrate 132 when present) to form what appeared to be a film. Moving from bottom to top in the upper portion 130 of FIG. 1, this film varied in color from deep dark red, to orange, to yellow at locations where the measured wall temperature varied from approximately 200° C. (near the neck 124) to 100° C. farthest from the furnace. As described more fully below, this film was found to include nanostructures of amorphous chalcogenide.

Microstructural Characterization

Figure 2A:
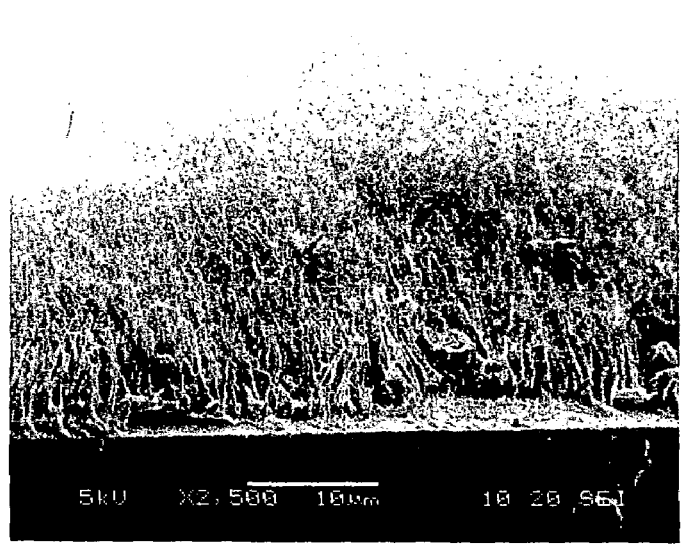
FIGS. 2A and 2B are SEM micrographs of arsenic sulfide nanowires grown on the walls of glass tubes as described in the Examples.
Figure 2B:
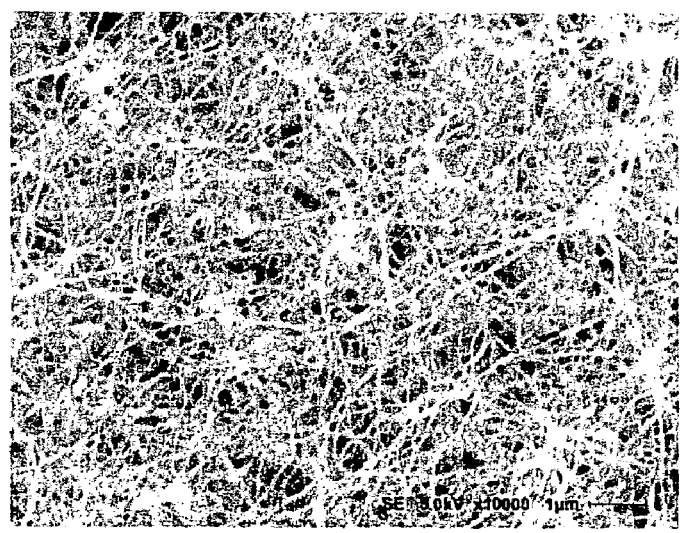

Microstructural characterization of the formed films was done using scanning electron microscopy (SEM) (JEOL 5900 LV, Amhurst, Mass.) and with transmission electron microscopy (TEM) (JEOL 2100, Amhurst, Mass.). SEM specimens were prepared by breaking the ampoule and carbon coating selected pieces in a vacuum evaporator. (Denton DV 502A vacuum evaporator, Cherry Hill, N.J.) FIGS. 2A and 2B show SEM micrographs, where FIG. 2A is the top view and FIG. 2B is a cross-section of the nanowires and substrate. The nanowires had diameters ranging from 40 to 140 nm and lengths of up to a few millimeters. These nanowires were formed in the low temperature region of the ampoule, near the top of portion 30 (FIG. 1), corresponding to the yellow portion of the film. The wall temperature at the nanowire growth location was between about 100 and 200° C.

The composition of the nanowires was measured by energy dispersive spectroscopy (EDS) (EDAX, Mahwah, N.J.) and they were verified to be arsenic sulfide in a molar ratio of 2:3, As:S. Since the starting material was also arsenic sulfide in a similar molar ratio, these results indicated that the compound had nondissociatively sublimed and deposited on the glass surfaces forming nanowires.

Figure 3:
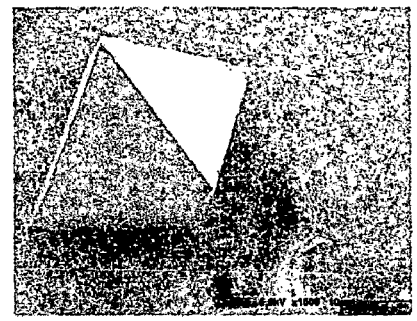
FIG. 3 is a top view SEM micrograph of an arsenic trioxide crystal sitting on a deposited thin film of arsenic sulfide nanowires.

One of the interesting observations was the presence of highly faceted crystals sitting on the surface of the nanowires, as shown in the SEM micrograph of FIG. 3. These crystals were identified to be $As_2O_3$, based on EDS results, and were observed in a number of different specimens. The micrograph of FIG. 3 shows a dimensional range of 3 orders (nm–μm).

Figure 4:
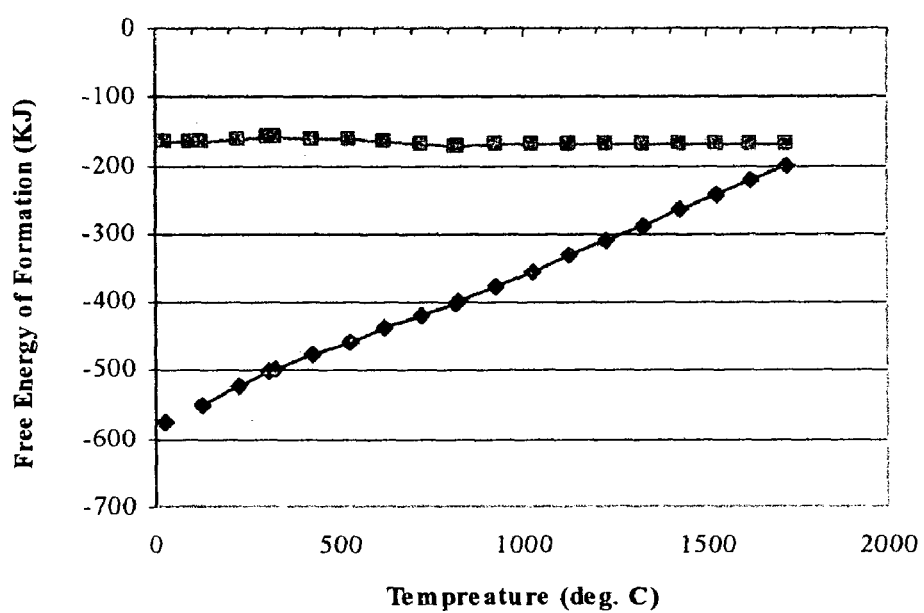
FIG. 4 is a plot of free-energy of formation of one mole of $As_2O_3$ (squares) and $As_2S_3$ (diamonds) vs. temperature.

FIG. 4 shows the temperature dependence of free-energy of formation of a mole of $As_2O_3$ and $As_2S_3$. Thermodynamically, $As_2O_3$ is more stable than $As_2S_3$ and its formation is more favored under comparable conditions. Both the $As_2S_3$ nanowires and the $As_2O_3$ crystals formed over a range of 100–200° C. Corresponding oxygen partial pressure values over the same temperature range (computed from Ellingham diagram) for the reaction $4/3\ As+O_2=2/3\ As_2O_3$ range from $10^{-48}$ to $10^{-36}$ atm., respectively. Thus, under the experimental conditions, there is probably sufficient oxygen present to form $As_2O_3$. This supports the co-existence of these two compounds in the samples.

Figure 5A:
FIGS. 5A and 5B are respectively longitudinal and cross sectional bright field transmission electron microscopy (TEM) micrographs of the nanowires grown according to the Examples.
Figure 5B:
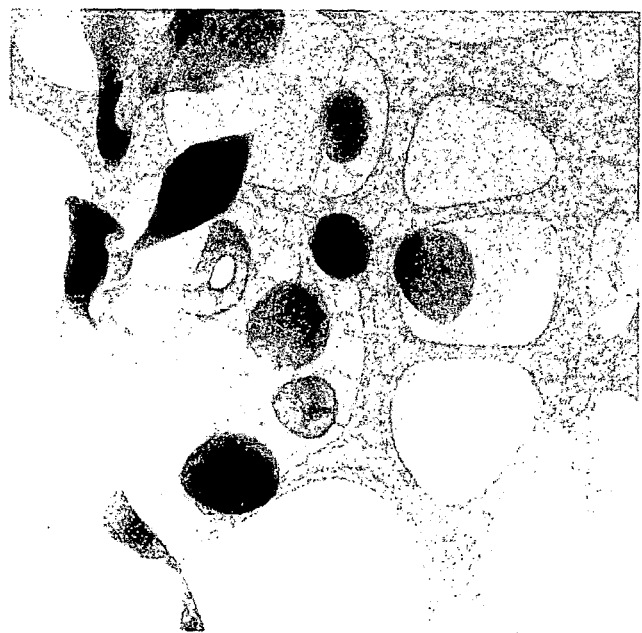

TEM specimens were prepared using two different methods. One approach used was to scrape the yellow film from the glass walls and disperse it into isopropyl alcohol. Alternatively, for cross-sectioned specimens, the scraped film was embedded in epoxy and sectioned using ultra-microtomy. Bright field micrographs of the nanowires are shown in FIGS. 5A (longitudinal view) and 5B (cross sectional view). EDS analysis verified the composition as approximately $As_2S_3$.

Figure 6:
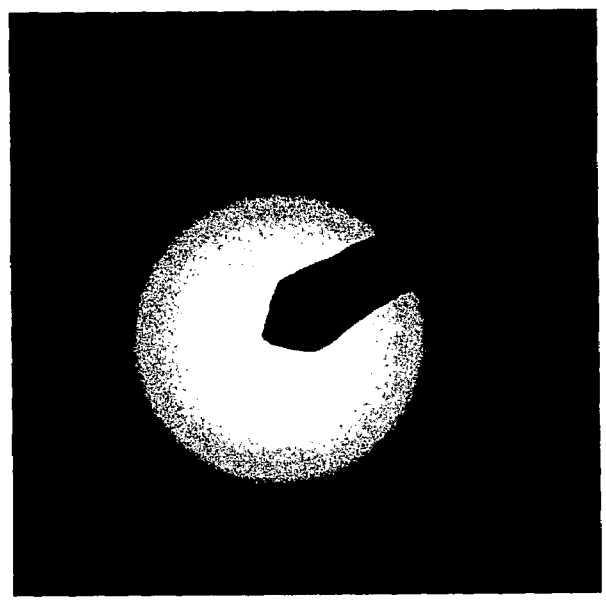
FIG. 6 is a selected area diffraction (SAD) pattern of the nanowires grown according to the Examples.
Figure 7:
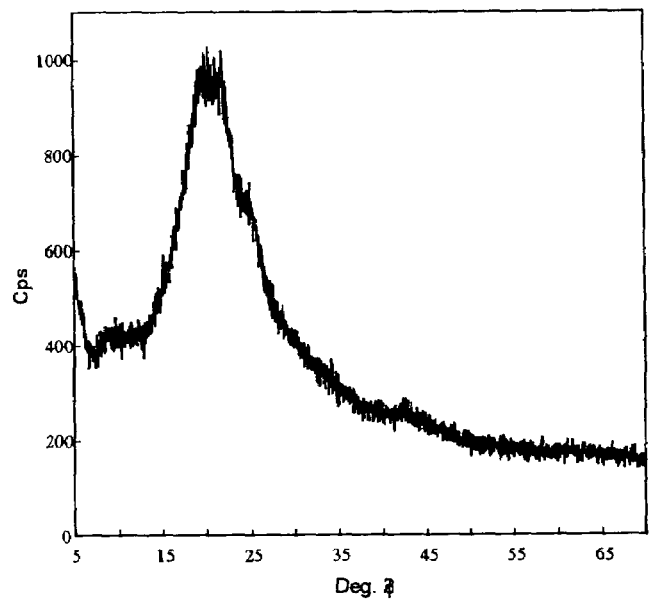
FIG. 7 is an x-ray diffraction (XRD) spectrum of the nanowires of FIG. 6.

A selected area diffraction (SAD) pattern of the nanowires is shown in FIG. 6, and an x-ray diffraction (XRD) spectrum is shown in FIG. 7. The SAD and XRD results confirm that the nanowires were amorphous, for example as illustrated by the broad diffuse hump in the XRD of FIG. 7.

Figure 8:
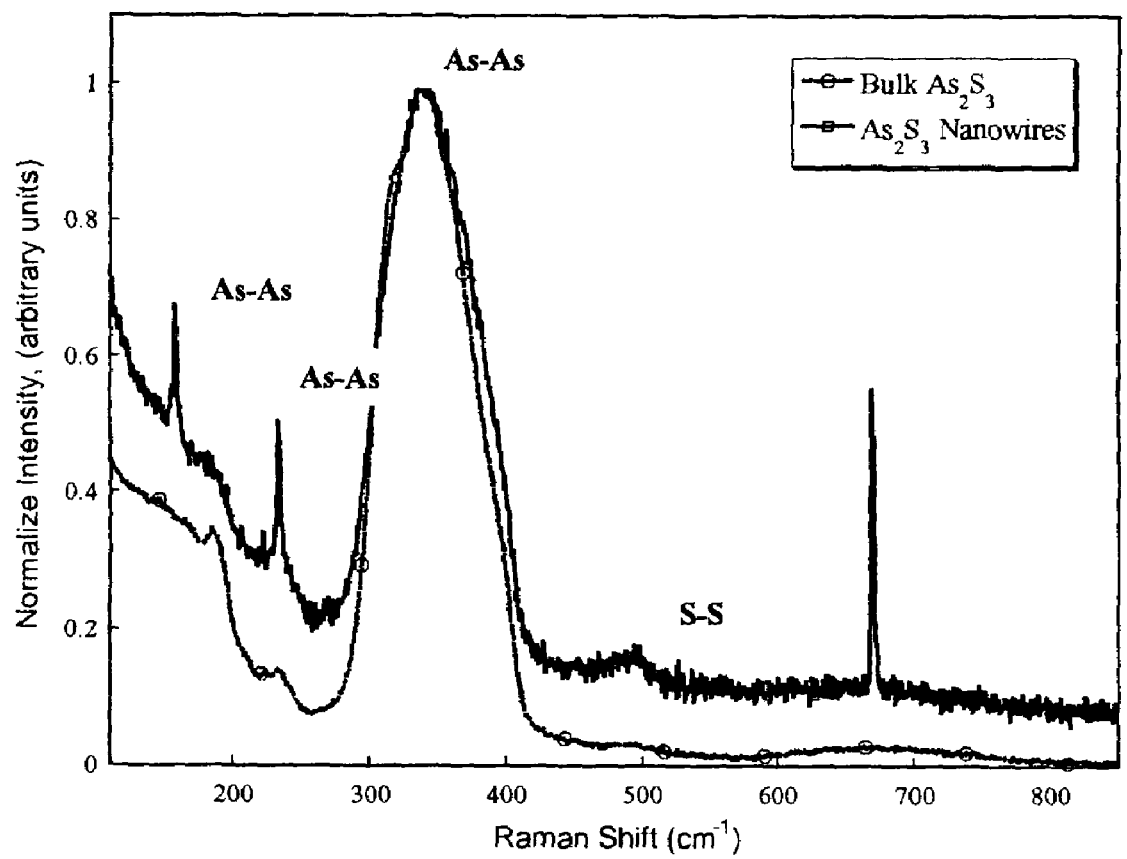
FIG. 8 is a plot of Raman spectra for the bulk starting material and the nanowires formed according to the Examples.

Even though bulk arsenic sulfide glass was dark red in color, the nanowire films were yellow, which initially led the investigators to suspect that the deposited yellow film was sulfur rich. However, various chemical analyses confirmed that the yellow nanowires film was an arsenic sulfide compound with a nominal composition close to $As_2S_3$ ($As_{40-43}S_{60-57}$). FIG. 8 shows a comparison of Raman spectra for the bulk starting material and the nanowires. Sharp peaks corresponding to S—S and As—As bonds observed in the Raman spectra for the nanowires as compared to that of bulk glass support formation of well-defined nanowires. The sharp peak around 670 cm⁻ is due to a plasma line from the $Kr^+$ laser used for Raman analysis. The plasma line was more pronounced in the nanowire specimen because the nanowire specimen was a thin film and more reflective than the bulk As—S piece. XRD, SAD, and Raman consistently confirmed that the nanowires were amorphous.

Without intending to be bound by any theory of operation, it is believed that the growth of these nanowires does not involve a liquid phase on the substrate that serves as a cluster or catalyst for the absorption of reactants, for example as required by the vapor-liquid-solid (VLS) mechanism for growing Si whiskers (R. S. Wagner, W. C. Ellis, *Appl.Phys. Lett.* 4, 89 (1964)) or the analogous solution-liquid-solid (SLS) process (T. J. Trentler et al., *Science* 270, 1791 (1995); H. F. Fan et al., *Chem. Phys. Lett.* 323, 224 (2000)), each of which can be considered catalytically assisted processes. Rather, since the nanowires were of nearly identical stoichiometry as the bulk As—S starting material and the formation temperature was much below the melting temperature of the As—S starting material, a type of vapor-solid process is likely at work. However, at least one other vapor-solid type process seems to require surface features (namely etching on an oxide substrate) to provide critical nucleation sites which define rod diameters. [W. B. Cambell, *Whisker Technology*, (Wiley, N.Y., 1990; P. Yang, C. M. Lieber, *J. of Mat. Res.* 12, 2981 (1997)]. The fact that these nanowires were formed on amorphous substrates (fused quartz or borosilicate), suggests that another mechanism is implicated.

A postulate is that surface charges of glass surfaces are responsible for the growth of these nanowires. For example, for a fused silica substrate ($SiO_4$ tetrahedra) surface oxygen (negative charge) acts as the site of $As_2O_3$ crystal growth by interaction with As. Surface silicon (positive charge) acts as the site for nucleation and growth of the As—S nanowire by interaction with S. $As_2O_3$ and $As_2S_3$ have identical crystal structure, and thermodynamics favors the oxide formation even in the case of small oxygen concentrations ($10^{-36}$–$10^{-48}$ atm). It is therefore believed that the sizes of the elements O and S dictate the mobility as well as rate of growth and geometry of the resulting structures.

Accordingly, formation of similar structures with chalcogenides of other class III–V compounds is expected. In addition, nanostructures may be formed according to the principles of the present invention utilizing different families of compounds that have higher vapor pressure at relatively lower temperatures, for example $As_2Se_3$, CdS, and CdSe.

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. A method comprising:
providing a chalcogenide vapor comprising As and chalcogen in a molar ratio of X, wherein X is between about 1:19 and about 3:4; and
growing substantially amorphous chalcogenide nanowires on a preselected portion of a substrate exposed to the chalcogenide vapor wherein the chalcogenide nanowires have a molar ratio of As to chalcogen within about 10% of X, and wherein the chalcogenide nanowires are grown on an optical fiber.

2. The method of claim 1 wherein the optical fiber is substantially transparent to infrared light.

3. A method comprising:
providing microscale structures on an implant by subliming a material to provide a vapor phase and depositing the vapor phase onto a surface of the implant such that microscale structures of the vapor phase are formed on a preselected portion of the implant wherein the structures comprise micro-crystals and wherein the micro-crystals comprise $As_2O_3$.

* * * * *

UNITED STATES PATENT AND TRADEMARK OFFICE
CERTIFICATE OF CORRECTION

PATENT NO. : 7,211,296 B2 Page 1 of 1
APPLICATION NO. : 10/646264
DATED : May 1, 2007
INVENTOR(S) : Bradley R. Johnson et al.

It is certified that error appears in the above-identified patent and that said Letters Patent is hereby corrected as shown below:

On the Title Page 2 item 56 (line 1):
In Other Publications, "Chalcogenidt" should read --Chalcogenide--.

In the Abstract item 57 (line 2):
"of on a substrate" should read --of a substrate--.

In the Specification:
Column 5, line 30, "illustrating of a system" should read --illustrating a system--.

Column 6, line 55, "illustrating a specific" should read --illustrating specific--.

Column 7, line 41, "furnace 26" should read --furnace 126--.

Signed and Sealed this

Twenty-seventh Day of January, 2009

JOHN DOLL
*Acting Director of the United States Patent and Trademark Office*